US007080317B2

(12) United States Patent
Lebow

(10) Patent No.: US 7,080,317 B2
(45) Date of Patent: Jul. 18, 2006

(54) TEXT HIGHLIGHTING COMPARISON METHOD

(76) Inventor: David G. Lebow, 1101 Old Fort Dr., Tallahassee, FL (US) 32301

( * ) Notice: Subject to any disclaimer, the term of this patent is extended or adjusted under 35 U.S.C. 154(b) by 464 days.

(21) Appl. No.: 10/153,939

(22) Filed: May 23, 2002

(65) Prior Publication Data

US 2003/0014216 A1 Jan. 16, 2003

Related U.S. Application Data

(60) Provisional application No. 60/294,236, filed on May 31, 2001.

(51) Int. Cl.
*G06F 15/00* (2006.01)
(52) U.S. Cl. .................. 715/512; 715/517; 715/530

(58) Field of Classification Search ................ 715/532, 715/501, 526, 513, 517, 523, 530, 512; 345/350, 345/473
See application file for complete search history.

(56) References Cited

U.S. PATENT DOCUMENTS

| 5,893,132 A * | 4/1999 | Huffman et al. ............. 715/532 |
| 6,177,945 B1* | 1/2001 | Pleyer ......................... 345/473 |
| 6,268,851 B1* | 7/2001 | Bricklin et al. ............. 715/744 |
| 2002/0167534 A1* | 11/2002 | Burke ......................... 345/629 |

* cited by examiner

*Primary Examiner*—Stephen Hong
*Assistant Examiner*—Kyle R. Stork

(57) ABSTRACT

A method for processing and displaying individual views of the application of pre-defined criteria to textual material. The use of visually-differentiated emphasis to display similarities and differences can take a variety of forms, including color-coded highlighting of text, underlining, circling, or the insertion of graphical symbols.

15 Claims, 14 Drawing Sheets

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1  The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 2

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 3

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 4

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 5

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 6

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." ██████████████████████████████████████████████████████████████████████████████████████████████████████████████████████████████—40 ████████████████████████████████████████████████████ ██████████████████████████████ We decline that invitation. The significant disagreement within the Court of Appeals for the Federal Circuit —38 concerning the application of Graver Tank suggests, however, that the doctrine is not free from confusion. We therefore will endeavor to clarify the proper scope of the doctrine.

I  36— —26

The essential facts of this case are few. ████████████████████████████ ██████████████████████████████████████████████ ████████████████████████████████████████████████ ████████████████████████████████████████████████ ████████████████████████████████████████████████ ████████████████████████████████████████

34—

FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 9

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence —40 between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit —42 concerning the application of Graver Tank suggests, however, that the doctrine is not free from confusion. We therefore will endeavor to clarify the proper scope of the doctrine.

I 36

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

34

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 10

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence —40 between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit —42 concerning the application of Graver Tank suggests, however, that the doctrine is not free from confusion. We therefore will endeavor to clarify the proper scope of the doctrine.

I
—26

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 11

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit —38 concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 12

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe ▬▬▬▬▬▬▬▬▬ —40
▬▬▬▬▬▬▬▬▬▬▬▬▬▬▬▬▬▬▬▬▬▬▬▬▬▬▬▬▬▬▬▬▬▬▬▬▬▬▬▬▬
▬▬▬▬▬▬▬▬▬▬▬▬▬▬▬▬▬▬▬▬▬▬▬▬▬▬▬▬▬▬▬▬▬▬▬▬▬▬▬▬▬
▬▬▬▬▬▬▬▬▬▬▬▬▬▬▬▬▬▬▬▬▬▬▬▬▬▬▬▬▬▬▬▬▬▬▬▬▬▬The
significant disagreement within the Court of Appeals for the Federal Circuit  —42
concerning the application of Graver Tank suggests, however, that the doctrine is
not free from confusion. We therefore will endeavor to clarify the proper scope of
the doctrine.

I    36—

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

34—

FN1   The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 12B

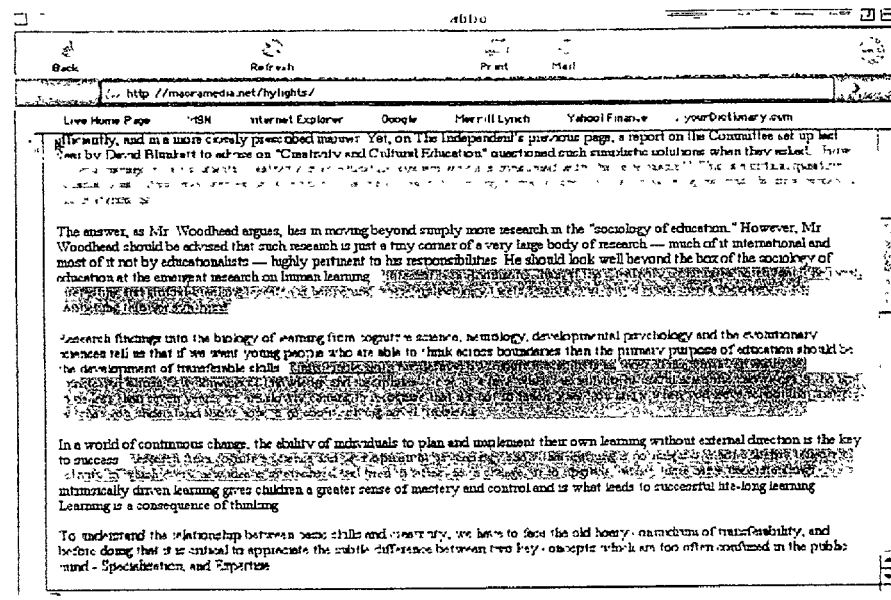
44
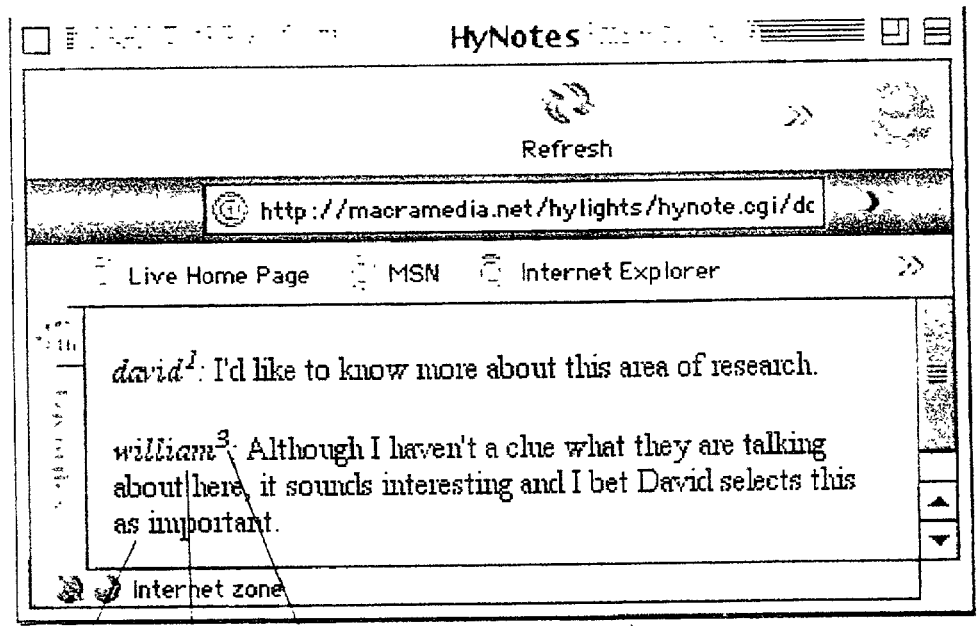
52  48  30  46
FIG. 13

TEXT HIGHLIGHTING COMPARISON METHOD

CROSS-REFERENCES TO RELATED APPLICATIONS

This application is a non-provisional application claiming the benefit of a previously-filed provisional application. The prior application was assigned No. 60/294,236. It was filed on May 31, 2002, and it listed David G. Lebow as the inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention.

This invention relates to the field of text analysis. More specifically, the invention comprises a method for comparing and evaluating the perceptions of text analyzed by a group of individuals.

2. Description of the Related Art.

Methods for emphasizing certain passages within a larger body of text have likely existed for as long as the written word itself Circling or underlining certain passages is an accepted convention for emphasis. In recent year, the adoption of brightly colored "highlighting" markers has largely supplanted the older processes.

Annotating bodies of text with footnotes or other commentary written in the margins is also a long-standing practice. Some texts which are a frequent object of commentary or criticism —such as religious works—are often printed with copious margins specifically intended to accommodate added handwritten notes. In recent year, both the practice of emphasizing certain passages and the practice of adding commentary have been automated through the use of computers. As one example, many word processing programs allow a user to emphasize text via displaying it in a different color. Some such programs display input from different users in different colors—with the result that the author of each passage may be easily determined. Thus, the use of color to differentiate text and the use of added commentary or criticism are both well known in the prior art.

BRIEF SUMMARY OF THE INVENTION

The present invention has three primary components: (1) A method for using color (or other type of emphasis element) to study a group's perception, reaction, or response to a body of text; (2) A method for comparing the group data to data collected from one individual; and (3) A method for applying annotations to a body of text to further facilitate an understanding or analysis of the text.

BRIEF DESCRIPTION OF THE SEVERAL VIEWS OF THE DRAWINGS

The file of this patent contains at least one drawing executed in color. Copies of this patent with color drawing(s) will be provided by the Patent and Trademark Office upon request and payment of the necessary fee.

FIG. 2 is a page of text, showing emphasis added by User 1.

FIG. 3 is a page of text, showing emphasis added by User 2.

FIG. 4 is a page of text, showing emphasis added by User 3.

FIG. 5 is a page of text, showing emphasis added by User 4.

FIG. 6 is a page of text, showing emphasis added by User 5.

FIG. 9 is a page of text, illustrating the result of the physical combination shown in FIG. 8.

FIG. 10 is a page of text, showing how computer software can be substituted for the physical combination.

FIG. 11 is a page of text, showing a second t of computer combination.

FIG. 12 is a page of text, showing a third type of computer combination

FIG. 12B is a page of text, showing a fourth type of computer combination.

FIG. 13 is a graphical depiction of a computer user interface, showing how annotations can be made to a body of text.

REFERENCE NUMERALS IN THE DRAWINGS

Figure 1:
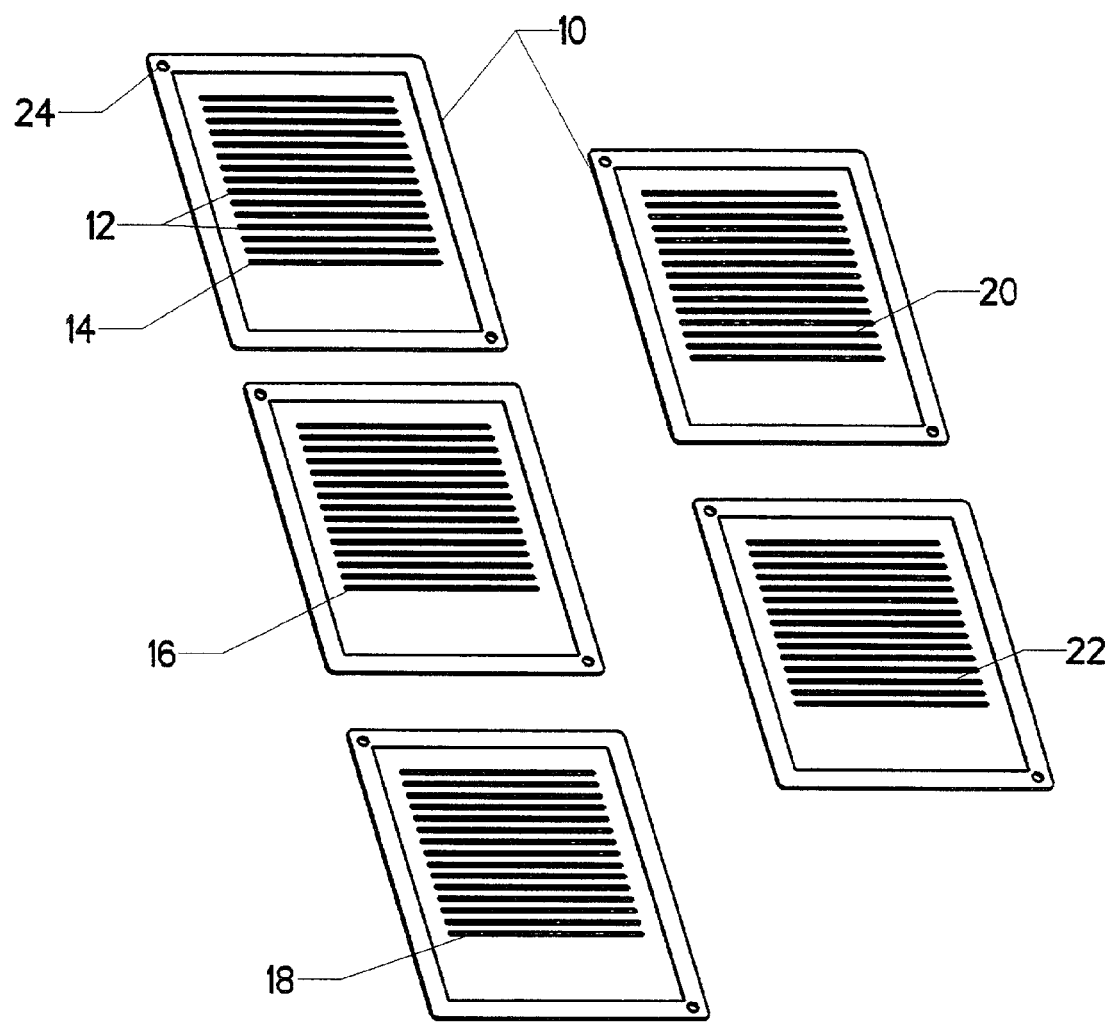
FIG. 1 is an isometric view, showing the first step in a mechanical implementation of the present invention.

| 10 | transparency | 12 | text |
|---|---|---|---|
| 14 | user 1 text | 16 | user 2 text |
| 18 | user 3 text | 20 | user 4 text |
| 22 | user 5 text | 24 | alignment hole |
| 26 | emphasized text | 28 | fixture |
| 30 | alignment pin | 32 | light source |
| 34 | one vote region | 36 | two vote region |
| 38 | agreement region | 40 | three vote region |
| 42 | four vote region | 44 | main window |
| 46 | pop-up window | 48 | user name |
| 50 | user number | 52 | annotation |

DETAILED DESCRIPTION OF THE INVENTION

The proposed invention could be implemented using many different technologies. In its simplest form, a purely mechanical implementation may be used. Although this implementation is somewhat impractical given the availability of more modern technologies, it is useful as a starting point to understand the invention.

FIG. 1 shows five different transparencies 10 (mounted in frames). Each transparency 10 contains identical printed text 12. The five transparencies 10 are given to five separate users. The users are then given a set of criteria for evaluating the text. In this particular example, the users are asked to emphasize portions of the text believed to be important. Many emphasis methods could be used—such as circling, underlining, or highlighting in color (generically referred to herein as "emphasis elements"). For this particular example, the five users are asked to highlight portions deemed important in transparent yellow ink.

The result will be that the identical text is altered by the selective application of emphasis elements by the different users. Five distinct transparencies are thereby produced—user 1 text 14, user 2 text 16, user 3 text 18, user 4 text 20, and user 5 text 22. FIGS. 2 through 6 show the text on the transparencies with the applied emphasis elements. FIG. 2 shows the text with color-coded portions denoted as emphasized text 26. It represents the selections made by user 1. FIGS. 3, 4, 5, and 6 represent the selections made by users 2, 3, 4, and 5, respectively.

At this point, a set of data regarding a textual analysis performed by these individuals has been collected. A user of the invention might then want to know how the selections of one individual compared to the selections made by the group as a whole. Assume, as an example, that one wants to know how the selections made by user 1 (shown in FIG. 2) compare to the group as a whole. User 1's selection is left as shown in FIG. 2 (highlighted in yellow). FIGS. 3 through 6, however, are altered so that the selections made appear in light blue transparent ink (via a copying process or other means).

Figure 7:
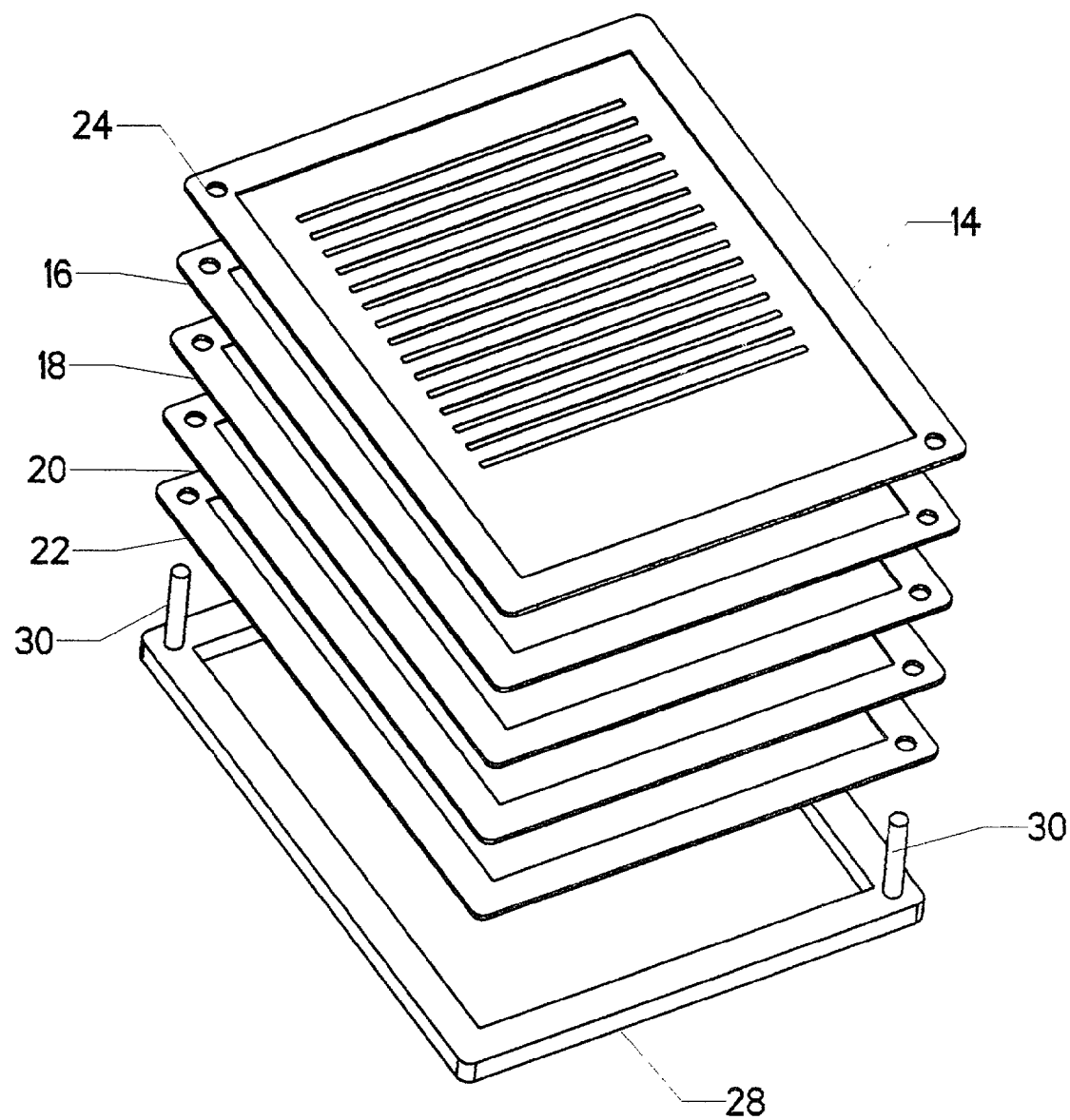
FIG. 7 is an isometric view, showing how text from various users can be combined for comparison.
Figure 8:
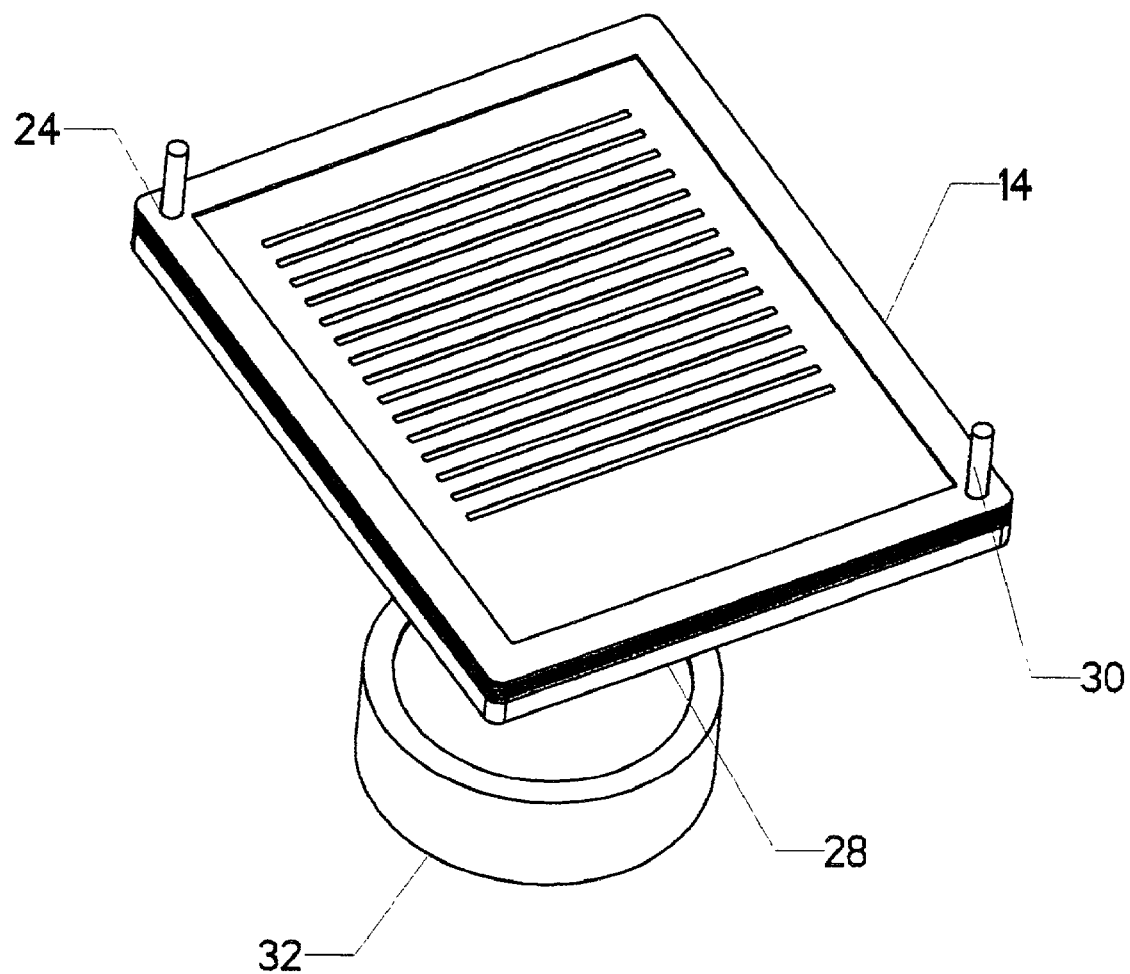
FIG. 8 s an isometric view, showing how light can be used to physically compare the text from various users.

The resulting transparencies are then stacked vertically, as shown in FIG. 7. The frame of each transparency has an alignment hole 24. These are placed over alignment pins 30 in fixture 28, thereby ensuring that the transparencies are perfectly aligned. The ordering of the transparencies in the stack is not significant, although they are shown stacked in order. Once the stack is complete, light source 32 is directed upward through the stack.

The user then views the stack from the top, with the result that the colored selections made by each user will be visible and will be combined. FIG. 9 shows the view afforded the user in this example. The yellow portion—denoted as emphasized text 26—indicates a selection made by user 1 but no one else. The lightest blue portions—denoted as one vote regions 34—indicates that only one of users 2 through 5 selected these sections for emphasis (the lightest blue color being the color to which the yellow original color was altered for users 2 through 5).

The medium blue portions—denoted as two vote regions 36—indicate that two of users 2 through 5 selected these sections. Those skilled in the art will realize that the darker shade results from the fact that two of the lightest blue portions are overlapped in the stack. The darkest blue portions—denoted as three vote regions 40—indicate that three of users 2 through 5 selected these portions. Obviously, an even darker shade would exist if all four of users 2 through 5 selected a portion (which did not happen in this example).

Agreement region 38 is particularly significant. It has a green color, indicating that a yellow portion highlighted by user 1 has overlapped with selections made by the other users (resulting from the fact that light shining through a yellow transparent dye and a blue transparent dye will produce green). The darker the shade of green, the greater the consensus on that selection. Thus, the resulting combined analysis could inform user 1 of the following: (1) He or she emphasized one portion of the text that no other user deemed important; (2) He or she emphasized one portion concerning which there was considerable consensus; and (3) He or she failed to emphasize a portion which 3 of the 4 other users deemed important. Obviously, other information could be gleaned from the graphical representation as well.

Applying this basic "mechanical" technique could also produce many other results. As one more specific example—one studying the group might want to graphically illustrate the selections of the group as a whole. In that event, all the highlighted transparencies could be left in the same color. Then, when they are stacked as shown in FIG. 7, the areas concerning which there is consensus would appear as darker and darker shades of the highlighting color.

Those skilled in the art will realize that many more users could be evaluated using this same technique. However, one would ultimately reach a limit of light transmission through a very large stack of transparencies. With the availability of computer graphics, the use of physical transparencies is obviously not a preferred method for carrying out the invention. It is now easy to have the text selections made by a user sitting at a computer and viewing the text on a monitor. The user can then highlight the selected text using a keyboard, mouse, or other input device. Computer software can then be employed to combine the selections and present the data in a graphical format. The data can be collected from users sitting at different computers (via the Internet or other datalink) or by a succession of users sitting at one computer.

The computer would display the text on the screen and the user is again given a set of criteria which guides the user in applying the emphasis elements to the text. For this particular example, assume that the user is asked to drag a mouse pointer over selected portions deemed important, with the result that the computer then displays those portions in yellow. Further assume that there are again five users, and that the selections made again conform to that displayed in FIGS. 2 through 6. Computer software is then used to combine the results.

In this example, one studying the group results only wants to evaluate group consensus (i.e., they are not trying to evaluate one individual's responses against the group as a whole). The software can be configured to display the number of "votes" for each portion in a different color. Because this example does not employ a physical combination process, virtually any shade of color could be selected to represent the number of votes (limited only by the computer's ability to display them and the user's ability to discern among differing shades).

FIG. 10 shows one possible graphical display of the result. The software has been configured to display the following colors: (1) One-vote regions 34 are displayed in yellow; (2) Two-vote regions 36 are displayed in light green; (3) Three-vote regions 40 are displayed in light blue; and (4) Four-vote regions 42 are displayed in medium blue. Using this graphical result, a user can evaluate the level of consensus or discord regarding the group's opinions.

Of course, for a larger group of 30 or 40 users, it is generally preferable to show the results as increasingly darker shades of the same color. In that way, one viewing the results intuitively realizes where there is consensus (via observing the regions of darker color) without having to refer to a color key. The use of varying shades of the color gray have been found to be particularly effective, as they produce a natural visual hierarchy.

FIG. 11 shows a computer graphical display comparing selections made by user 1 to selections made by the group as a whole. In this display, the user has configured the software to display only: (1) selections made by user 1 but no one else (yellow); (2) selections receiving three votes (light blue); and selections receiving four votes (medium blue).

FIG. 12 shows a computer graphical display comparing selections made by user 1 to the selections made by the group, but adding the color green to indicate those portions selected by user 1 and other members of the group (agreement region 38). Graduations in the shade of the color green could be employed to indicate the degree of agreement between user and the group (i.e., darker shades of green indicate a greater number of the other users selected that portion for emphasis).

For a large group of users, experience indicates that the results may be rapidly perceived in graduations of a single color. FIG. 12B shows such a result for a large group. The software has been configured to display the results by applying progressively darker shades of blue to passages receiving progressively more votes. The color graduations can be made in 5 vote increments; i.e., 5 votes are needed for the lightest color, 10 votes are needed for the next darker shade, 15 votes are needed for the shade beyond that, and so on. The result is that this method can be applied to groups comprising thousands of members.

The reader will by this point appreciate the fact that the results of the process can be displayed in a variety of ways. The use of color highlighting has been discussed in detail. The results could also be displayed via the use of underlining or circling (other common emphasis elements). If, on the other hand, there is a desire to display the results by viewing a text without immediately visible emphasis elements, one can configure the computer software to display the number of "votes" for a word or phrase as a raw number which appears whenever the user drags the cursor over that portion.

Although the preceding descriptions provide a basic understanding of the process, those skilled in the art will appreciate that the process can be applied in many different contexts. The following examples provide some illustrations of the application of the process.

EXAMPLE ONE

The process can be used to teach active reading. A sample essay is given to a group of students. The students are then asked to highlight the claims, supports, and warrants found in the text—using a different highlighting color for a claim, a support, and a warrant. Computer software is then used to produce a graphical display showing the consensus or lack of consensus as to each portion of the text. The software can also be used to generate a graphical display comparing the selections made by one particular user against the group selections.

For many well-studied texts, there is a conventionally accepted view as to which portions constitute the claims, supports, and warrants. For this type of text, the software could also be used to compare the group's selections against the standard view, as well as a specific individual's selections against the standard view. These graphical displays then become a teaching tool for teaching a student where he or she went wrong. They can also be an important tool for developing critical thought in those instances where the student disagrees with the accepted norm.

This application of the process would also be useful for a person desiring to study active reading. Such a researcher could observe the graphical display of the selections made by many hundreds of students in order to map their progress. Using the computer, many assessment processes could be applied to the data collected. A researcher might, as an example, be interested in performing a statistical analysis on a large body of students in order to determine the distribution of the selections the students made.

Throughout this specification, those skilled in the art will understand that other emphasis elements (such as underlining or circling) could easily be substituted for the use of color in the examples presented.

EXAMPLE TWO

The process can be used to facilitate understanding of negotiated documents, such as business contracts. A group of interested persons would be asked to emphasize the portions of the contractual document they deem important. If the group includes people from two different interested entities—such as two different companies negotiating a merger—they could be asked to highlight the important portions in a different color. The computer software would then create a graphical representation in which color is used to highlight significant points for both sides, as well as areas on which agreement exists. One side could be configured to highlight in blue while the other highlights in yellow. Text which was highlighted by both sides would appear in green, with a darker shade indicating increased consensus.

EXAMPLE THREE

The process can be used to survey constituent opinions when drafting a piece of legislation. Because the process can be remotely implemented over a computer network, a legislative representative could submit the proposed text of the legislation to a sample of the constituents. The constituents would be asked to highlight those portions they like or dislike. The process could then be employed to graphically display the results, using increasingly darker shades of color to indicate likes and dislikes (with, as an example, "likes" being in green and "dislikes" being in red).

The process as described previously can also be combined with annotation to create more flexibility. As an example, when a user highlights a particular piece of text deemed important, it is not necessarily apparent why the particular user deemed that portion to be important. Accordingly, the software can be configured to allow annotation of each selected portion. Referring now to FIG. 13, the reader will observe two user interface "windows." The upper window displays the text as presented to the group of users. As described previously, the software has been used to graphically display the results of the highlighting.

If a user selects a particular piece of highlighted text—using a mouse or other interface device—then pop-up window 46 appears. Pop-up window 46 displays the annotations which the users chose to enter as to the particular piece of highlighted text. A user number 30 is attached to each annotation. A user name 48 may also be attached. In this fashion, one viewing the results can study the comments made during the text emphasis process, and can discern which user made which comment. Those skilled in the art will know that pop-up windows are only one way of implementing this approach. The user interface could just as easily display dual windows showing the highlighting and the annotation at all times. The software could also allow for threaded discussions attached to selected annotations. Links to other texts could also be provided, so that a user who is interested in a particular annotation could learn more about the source materials.

In addition, text comparison algorithms, which are well known in the art, can be employed to determine which words or phrases were commonly used in the annotations. Words or phrases which are commonly used could then be selected for display in another window, again using color to indicate the frequency of use.

Although color has primarily been used to illustrate this process, those skilled in the art will realize that many different types of emphasis elements could be employed. As one additional example—underlining could be employed. The process could then thicken the underlining to show increasing consensus as to the selection of that piece of text. Italicized text could also be used, with an increasing pitch (or slant) angle being used to denote increasing consensus. Enlarged text with increasing enlargement to indicate increasing consensus could also be used.

Finally, graphical symbols could be inserted into the text to denote the start point and the end point of selected text. If, as an example, a reader wanted to emphasize the phrase "brown fox" out of the sentence "The quick brown fox jumped over the lazy dog", it could be denoted as "The quick @brown fox@ jumped over the lazy dog." Increasing consensus could then be displayed by an increasing number of such symbols, such as "The quick @@brown fox@@ jumped over the lazy dog." The use of such symbols is particularly advantageous for documents that must be transferred to different types of software (owing to the fact that color instructions vary whereas ASCII character instructions are subject to a universal standard).

Likewise, a virtually unlimited variation in the type of user interface is possible. These variations would simply be additional embodiments of the inventive method disclosed herein. Accordingly, the scope of this invention should be fixed by the following claims, rather than by the examples given.

Having described my invention, I claim:

1. A method for visually displaying selections made by a group of users regarding portions of emphasized text selected by members of said group from a larger body of text, comprising:
   a. defining criteria for the appropriate selection of said emphasized text;
   b. providing means for each of said users within said group to review said larger body of text and independently emphasize selected portions of said larger body of text by using an emphasis element to delineate each of said selected portions, thereby creating a separate emphasis-modified text for each user;
   c. analyzing said emphasis-modified texts for all of said users in order to determine how many of said users elected to emphasize a particular word within said larger body of text; and
   d. visually displaying the results of said analysis, using a plurality of graduated emphasis elements to indicate an increasing level of consensus as to said selected portions.

2. A method as recited in claim 1, wherein said emphasis element provided to said users comprises a color used to highlight said selected portions, and wherein said visual displaying of said results comprises the use of a plurality of colors to indicate increasing levels of consensus.

3. A method as recited in claim 2, wherein said plurality of colors comprises a progressively darker shade of the same color, wherein a darker shade indicates said increasing level of consensus.

4. A method as recited in claim 1, further comprising:
   a. wherein said defining criteria include:
      i. a first criterion, to be used for the selection of a first type of text;
      ii. a second criterion, to be used for the selection of a second type of text;
   b. wherein said emphasis means provided to each of said users includes:
      i. a first color used to highlight text selected according to said first criterion;
      ii. a second color used to highlight text selected according to said second criterion;
   c. wherein said step of visually displaying said results includes:
      i. displaying said selections made according to said first criterion in a progressively darker shade of said first color, wherein a darker shade indicates said increasing level of consensus; and
      ii. displaying said selections made according to said second criterion in a progressively darker shade of said second color, wherein a darker shade indicates said increasing level of consensus.

5. A method as recited in claim 1, further comprising:
   a. wherein said defining criteria include:
      i. a first criterion, to be used for the selection of a first type of text;
      ii. a second criterion, to be used for the selection of a second type of text;
   b. wherein said emphasis means provided to each of said users includes:
      i. a first color used to highlight text selected according to said first criterion;
      ii. a second color used to highlight text selected according to said second criterion;
   c. wherein said step of visually displaying said results includes:
      I. displaying said selections made according to said first criterion in a plurality of different colors, wherein said colors are employed to indicate said increasing level of consensus; and
      ii. displaying said selections made according to said second criterion in a plurality of different colors, wherein said colors are employed to indicate said increasing level of consensus.

6. A method as recited in claim 1, further comprising providing means for each of said users to annotate said selections of text by adding additional text explaining said user's motive for making said selection.

7. A method as recited in claim 2, further comprising providing means for each of said users to annotate said selections of text by adding additional text explaining said user's motive for making said selection.

8. A method as recited in claim 3, further comprising providing means for each of said users to annotate said selections of text by adding additional text explaining said user's motive for making said selection.

9. A method as recited in claim 4, further comprising providing means for each of said users to annotate said selections of text by adding additional text explaining said user's motive for making said selection.

10. A method as recited in claim 5, further comprising providing means for each of said users to annotate said selections of text by adding additional text explaining said user's motive for making said selection.

11. A method as recited in claim 1, where in said emphasis element provided to said users comprises underlining used to mark said selected portions, and wherein said visual displaying of said results comprises the use of thicker underlining to indicate increasing levels of consensus.

12. A method as recited in claim 1, wherein said emphasis element provided to said users comprises circling used to mark said selected portions, and wherein said visual displaying of said results comprises the use of thicker underlining to indicate increasing levels of consensus.

13. A method as recited in claim 1, wherein said emphasis element provided to said users comprises italicizing used to mark said selected portions, and wherein said visual displaying of said results comprises the use of italics having an increasing pitch angle to indicate increasing levels of consensus.

14. A method as recited in claim 1, wherein said emphasis element provided to said users comprises enlarged text used to mark said selected portions, and wherein said visual displaying of said results comprises the use of increasingly enlarged text to indicate increasing levels of consensus.

15. A method as recited in claim 1, wherein said emphasis element provided to said users comprises graphical symbols used to mark said selected portions, and wherein said visual displaying of said results comprises the use of increasingly numerous graphical symbols to indicate increasing levels of consensus.

* * * * *